United States Patent [19]
Marlowe

[11] 4,057,927
[45] Nov. 15, 1977

[54] REVERSE ACTION WEEDLESS HOOK
[75] Inventor: Kenneth P. Marlowe, Zwolle, La.
[73] Assignee: Raymond Lee Organization Inc., a part interest
[21] Appl. No.: 692,281
[22] Filed: June 3, 1976
[51] Int. Cl.² .............................................. A01K 83/00
[52] U.S. Cl. ............................................... 43/43.6
[58] Field of Search ..................................... 43/43.6

[56] References Cited
U.S. PATENT DOCUMENTS

| | | | |
|---|---|---|---|
| 712,032 | 10/1902 | Baker | 43/43.6 |
| 797,281 | 8/1905 | Henzel | 43/43.6 |
| 2,576,795 | 11/1951 | Lane | 43/43.6 X |
| 3,169,338 | 2/1965 | Morin | 43/43.6 |

*Primary Examiner*—Louis G. Mancene
*Assistant Examiner*—Daniel J. Leach

[57] ABSTRACT

A wire spring is attached near the top of the fishhook and is hooked under the barb of the hook. The shape of the spring is such that the spring stays hooked under the barb until a fish bites the hook to prevent the barb from getting stuck in weeds. After a fish bites, the movable end of the spring becomes forcibly disengaged from the barb, pushing the hook point into the fish's mouth.

5 Claims, 7 Drawing Figures

REVERSE ACTION WEEDLESS HOOK

SUMMARY OF THE INVENTION

The invention is directed towards an improved weedless fishhook that will not become snagged in weeds, logs, moss, coral, limbs or rock and that will force the point into the flesh of a fish that bites for bait live or artificial that is attached to it. As will be explained below, this invention utilizes a piece of wire that is bent in its normal position, and that is normally hooked under the barb of the fishhook. In this position the barb is shielded from becoming entangled in weeds and the like. However, when a fish bites on bait that is impaled upon the hook shank, the spring jumps out from underneath the barb and forces the point into the flesh of the fish's mouth, making a catch more likely.

BRIEF DESCRIPTION OF THE INVENTION

DETAILED DESCRIPTION OF PREFERRED EMBODIMENTS

Figure 1:
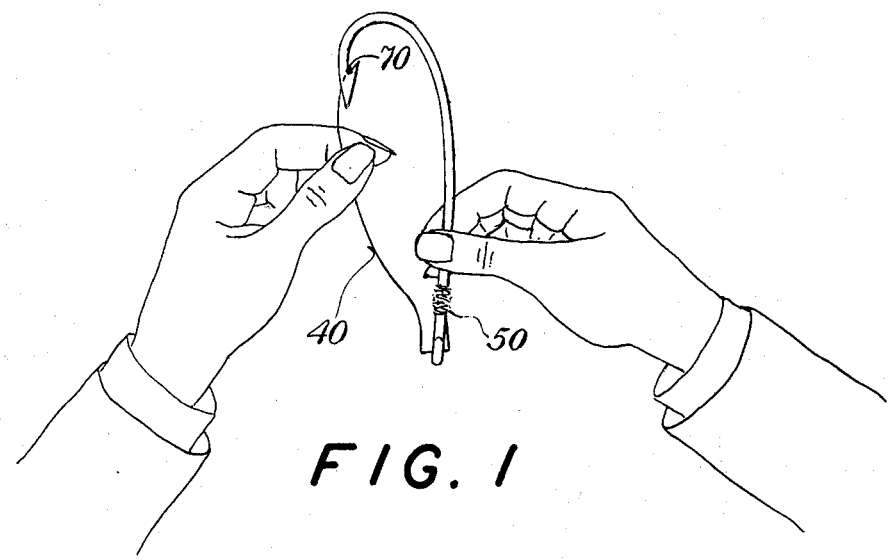
FIG. 1 shows a user setting the spring in the invention to its tension set position.
Figure 2:
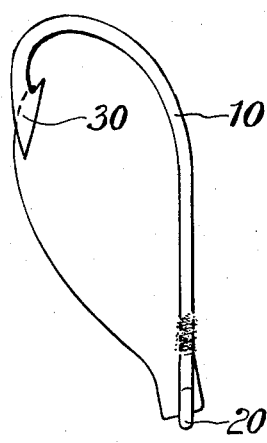
FIG. 2 shows the invention in its tension set state.
Figure 4:
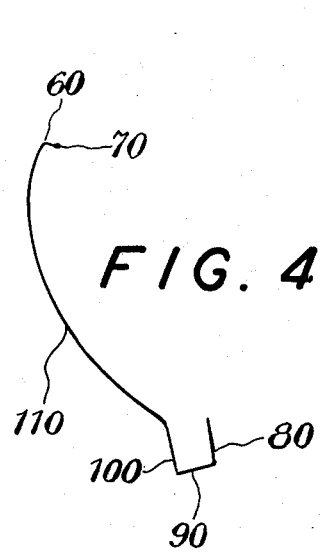
FIG. 4 shows the spring in its "tension" state.
Figure 3:
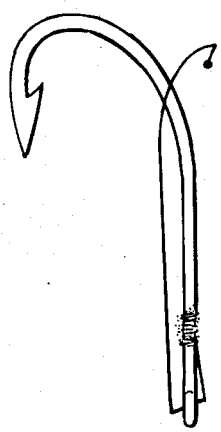
FIG. 3 shows the invention in its "tripped" normal state.

A J-shaped fishhook 10 has an eye 20 at the top of the J and an upwardly facing barb 30 at the bottom of the J. A spring generally indicated by 40 in FIG. 1 has a fixed end 50 that is wrapped around the fishhook near the eye and soldered thereto. The spring also has a movable end 60 that supports a small spherical (ball) weight 70 on its tip. It can be seen that the spring has three straight portions 80, 90 and 100, with portion 90 passing through the eye, and portions 80 and 100 being parallel to each other and perpendicular to portion 90. An outwardly curved portion 110 connects portion 100 with portion 60.

Figure 6:
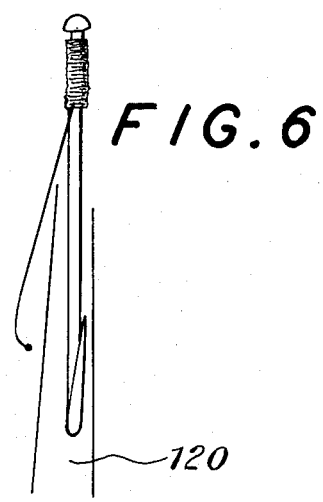
FIG. 6 shows how the spring in its "tripped" state clears the plastic worm impaled upon the hooks' shank, leaving entire gap and point exposed inside the fish's mouth.
Figure 7:
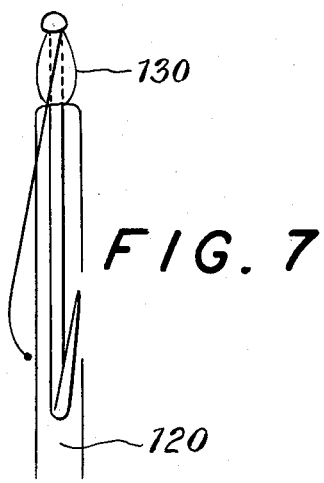
FIG. 7 shows the invention used with a weighted fishhook.
Figure 5:
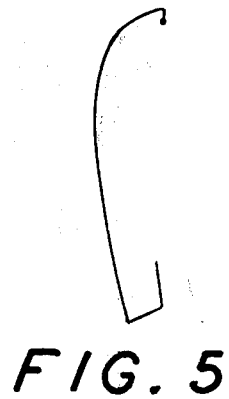
FIG. 5 shows the spring in the normal state.

When in its tension state, the spring serves to prevent the barb from becoming entangled with weeds, logs, moss, rocks, limbs and the like, because the interior of the fishhook is closed off. However, when a fish bites bait impaled upon the shank of the hook, the movable end of the spring is unhooked from the barb and the ball 70 allows the movable end to move downwardly and outwardly with some force, forcing the point deeper into the flesh of the fish's mouth and also clearing the bait, leaving entire gap and point exposed as is shown in FIGS. 6 and 7 with an artificial worm 120. The ball serves to maintain intact outward tension until the barb is released.

FIG. 7 shows the invention in use with a fishhook that has a weight 130 near the eye. To make sure that the spring clears the bait with sufficient clearance, the bends between portions 80, 90 and 100 can be adjusted. Bends 90, 100 and 110 can be adjusted for hair trigger or hard trigger, depending upon obstacles encountered while using.

It will be seen that the reverse action employed in this invention is opposite to that normally employed, hence the name "reverse action weedless hook". This invention can be used both with live or artificial bait.

I claim:

1. A weedless fishhook device comprising:
    a generally J shaped fishhook with an eye at the top of the J and an upwardly facing barb at the bottom of the J; and
    an elongated wire spring having a fixed end secured to the fishhook adjacent the eye and a movable end having a spherical ball affixed thereto, said movable end normally extending along the barb with the ball being hooked underneath the barb with the spring passing through the eye intermediate its ends, the spring having a shape at which when the ball is disengaged from the barb the spring snaps downwardly and away from the barb leaving the bottom of the J and the barb fully exposed.

2. The device of claim 1 wherein the fixed end is wrapped with wire around the fishhook near the eye.

3. The device of claim 2 wherein said fixed end is soldered to the fishhook.

4. The device of claim 1 wherein said spring has a first straight portion extending along the fishhook to the eye, a second straight portion perpendicular to the first portion and extending through the eye, a third straight portion parallel to the first portion and extending from the eye to an outwardly curved fourth portion, said fourth portion extending to the barb and terminating in said free end and said ball.

5. The device of claim 1 further including a weight secured to the fishhook adjacent the eye.

* * * * *